Figure 1:
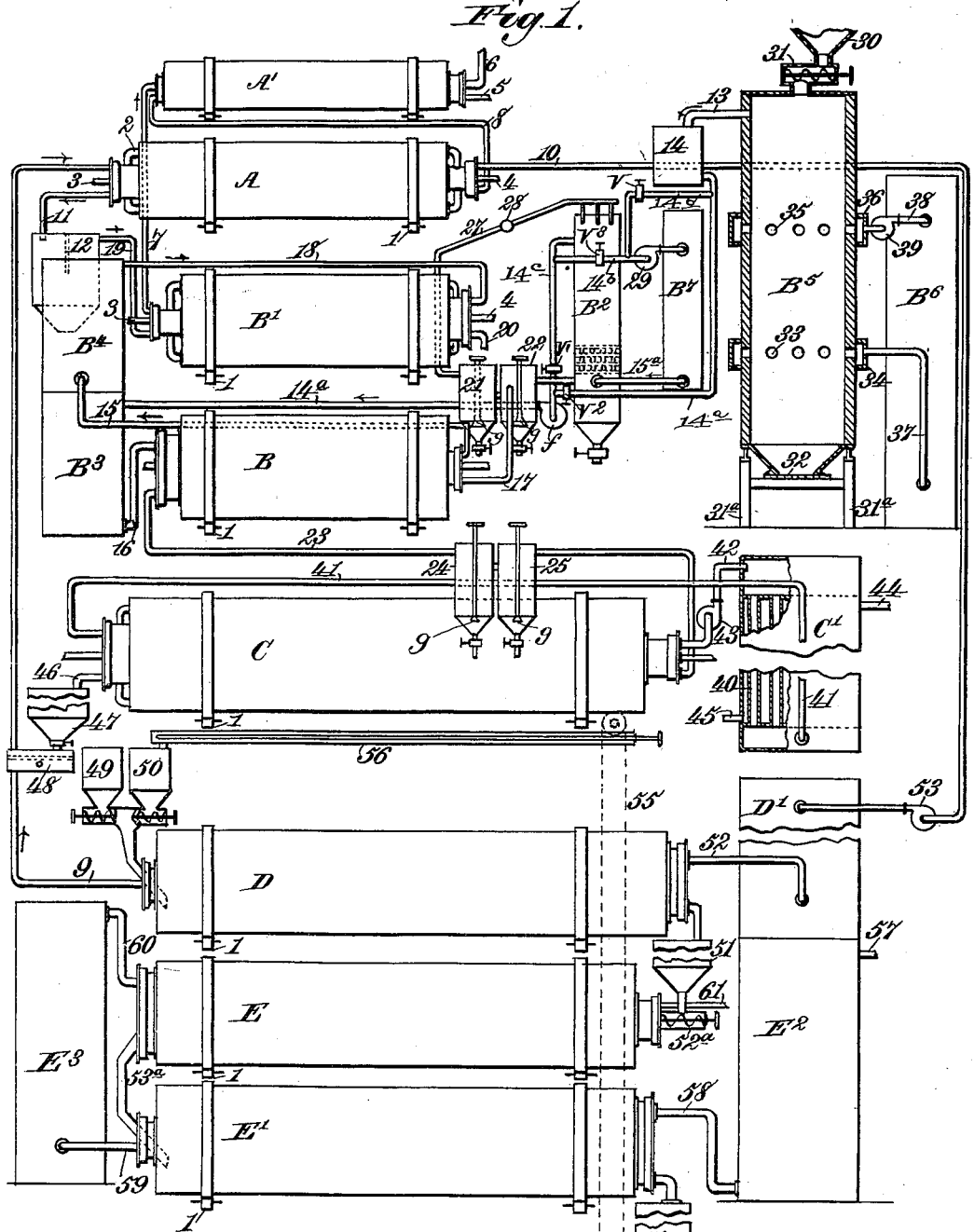

No. 658,576. Patented Sept. 25, 1900.
P. NAEF.
APPARATUS FOR MAKING ALKALIES.
(Application filed Mar. 28, 1900.)
(No Model.) 2 Sheets—Sheet 1.

Witnesses
Robert Everett
J. B. O'Keefe

Inventor
Paul Naef,
By James L. Norris
Atty.

No. 658,576. Patented Sept. 25, 1900.
P. NAEF.
APPARATUS FOR MAKING ALKALIES.
(Application filed Mar. 28, 1900.)
(No Model.) 2 Sheets—Sheet 2.
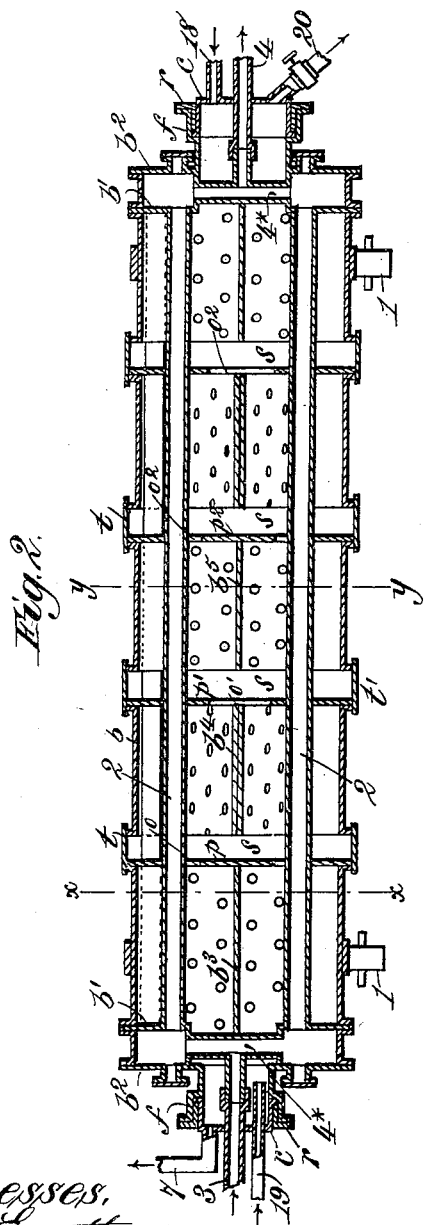
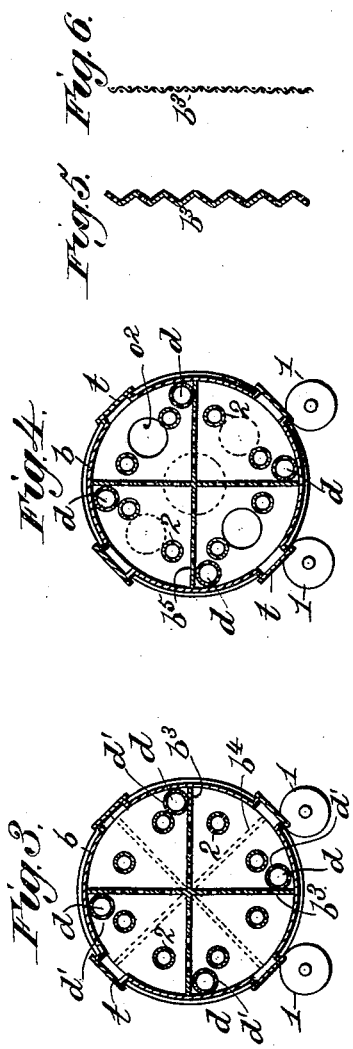
Witnesses,
Robert Evcutt.
Inventor
Paul Naef.
By James L. Norris
Atty.

UNITED STATES PATENT OFFICE.

PAUL NAEF, OF NEW YORK, N. Y.

APPARATUS FOR MAKING ALKALIES.

SPECIFICATION forming part of Letters Patent No. 658,576, dated September 25, 1900.

Application filed March 28, 1900. Serial No. 10,506. (No model.)

*To all whom it may concern:*

Be it known that I, PAUL NAEF, a citizen of the Republic of Switzerland, residing at New York city, in the county of New York and State of New York, have invented new and useful Improvements in Apparatus for the Manufacture of Alkali Products and Chlorine, &c., of which the following is a specification.

This invention relates to apparatus for use more especially in the manufacture of alkali products and chlorine from chloride of sodium, said apparatus being applicable also for other purposes which require the treatment of various materials with gases.

The apparatus is adapted for the continuous production of bicarbonate of soda and chlorine gas according to a process (described and claimed in my application, Serial No. 3,998, filed February 5, 1900) which consists of the following steps: first, saturating brine with ammonia gas obtained in a later step of the process; second, treating this saturated liquor with carbonic-acid gas for the production of bicarbonate of soda, a solution of chloride of ammonium being simultaneously produced; third, cooling the ammonium-chloride solution for the separation of solid ammonium chloride and returning the remaining solution to step 1 after saturating the same with solid sodium chloride; fourth, separating ammonia from the solid ammonium chloride by heating the latter with an oxide (preferably magnesium oxide) and returning the ammonia-gas to step 1, and, fifth, decomposing the mixture of magnesium oxide and chloride obtained by step 4 by means of heated air, returning the oxide to step 4, and utilizing the chlorine gas obtained by the decomposition for the manufacture of bleaching-powder.

Referring to the drawings, Figure 1 shows the general arrangement of the apparatus. Fig. 2 is a longitudinal section of a suitable form of revolving cylinder for treating the liquor with gas. Figs. 3 and 4 are respectively sections on lines $x\,x$ and $y\,y$ of Fig. 2. Figs. 5 and 6 are views of modified forms of perforated or wire-gauze partitions that may be employed in the revolving cylinder or cylinders forming part of the apparatus.

Referring to Fig. 1, the process is carried out in revolving cylinders A', A, B', B, C, D, E, and E', mounted on suitable rollers 1 1 and rotated in any suitable manner. In the interior of the cylinders A, B', B, and C for treating the liquor there are cooling-pipes 2, Figs. 2, 3, and 4, which run through the cylinders and are connected at one end to a pipe 3 for supplying a suitable cooling fluid and at the other end with an exit-pipe 4 for said fluid.

The interior arrangement of the cylinders may be varied according to the use and according to the quantity of precipitate formed in the apparatus; but said internal arrangement is such that the liquor and gas passing through the cylinders shall come into intimate contact. At each end these cylinders are closed by a stationary end plate or cover $c$, which has a flange fitting loosely into the flange on the end of the cylinder. A suitable packing is placed in the space between the two flanges and is tightened by a loose ring $r$. The stationary end plate $c$ carries suitable gas and liquor pipes. Through the center of this end plate $c$ passes the pipe 3, which is connected to the cooling-pipes 2 by a connecting-pipe 4*, Figs. 1 and 2, and which is to be joined to a stationary supply-pipe by a suitable stuffing-box.

The brine used in the process is saturated with ammonia by passing it first through a washer A' and afterward through a saturator A. The washer A' is used for washing the waste gases resulting after the treatment of the brine with carbonic-acid gas and is constructed so that the said gases pass through it in a zigzag path. The fresh brine runs continually into the washer A' through pipe 5, and the waste gas leaves, practically free from ammonia, through a pipe 6. The waste gas from cylinder B' enters the washer A' through pipe 7, and the brine leaves the same apparatus through a pipe 8, which delivers the said brine to the saturator A.

Ammonia-gas from the fourth step of the process, which is carried out in cylinder D, enters this saturator A continuously through a pipe 9. The gas, which leaves the saturator A through pipe 10, is returned to D, as later on described. The brine saturated with ammonia leaves the saturator A through a pipe 11 and passes through settling-tank 12 for removal of any lime or other impurity precipitated from the brine.

The saturated brine is treated with carbonic-acid gas in the cylinders B and B' for the precipitation of bicarbonate of soda. This operation is carried out with as efficient cooling as possible. This cooling is partly effected by circulating water or other cooling fluid through the pipe system in the cylinders B' and B. As the cooling-pipes get gradually covered with scale, which reduces their efficiency, more thorough cooling is effected by previously cooling the carbonic-acid gas used in the process. This carbonic-acid gas comes from a suitable kiln $B^5$ (to be later on described) through pipe 13 and passes through a suitable washer 14 to remove dust and other impurities. It enters through a pipe $14^a$ a suitable gas-cooler $B^3$, in which it is cooled to low temperature.

The cold gas leaves the cooler $B^3$ through pipe 16 and enters cylinder B, where the said gas is brought into intimate contact with liquor flowing into said cylinder B from pipe 17. The unabsorbed gas leaves the cylinder B through pipe 15 and enters cooler $B^4$. Here the said gas is again cooled and then leaves through pipe 18, through which it enters cylinder B', leaving the latter (practically free of carbonic acid) through pipe 7, by which it is conducted to washer A', as above described. The brine saturated with ammonia enters cylinder B' through pipe 19 from settling-tank 12 and leaves B' by pipe 20. The said brine then flows through settling-tanks 21, $B^2$, and 22 to settle bicarbonate of soda. It then enters cylinder B through pipe 17. From the cylinder B a pipe 23 conducts the said brine through the settling-tanks 24 and 25, in which most of the bicarbonate settled is withdrawn from the conical bottoms.

The system for treating the liquors with carbonic-acid gas above described gives a most intimate contact of gas and liquor and very efficient cooling and can be used for very dilute gases. The said system requires very little gas-pressure, which may be supplied by a suitable fan.

The coolers $B^4$ and $B^3$ may be of any suitable construction. They can be constructed on the principle of the locomotive-boiler, and any suitable fluid can be used for cooling. As no liquor passes through these gas-coolers, they need no cleaning, and their efficiency does not become less as the process proceeds.

If ammoniated brine is treated in the way described, it is noticed that but little bicarbonate of soda is formed in the beginning and also toward the end of the treatment. Most of the precipitation takes place during a middle period. It is therefore of advantage to treat the liquor during this middle period in an apparatus which allows an easy removal of the bicarbonate of soda and that can easily be cleaned without interfering with the general run of the process. Such is the absorption vessel $B^2$, which consists of a vertical cylinder having a suitable filling or checkerwork, which gives no resistance and can be quickly removed or cleaned by steaming. A continuous flow of liquor is sent into the top of the vessel $B^2$ through pipe 27, leading from settling-tank 21 and connecting with a pump 28 for drawing residual liquor from said settling-tank. During its passage through $B^2$ this liquor meets a current of cold strong carbonic-acid gas. Much of the bicarbonate of soda is thereby caused to settle in the conical bottom of $B^2$, from which it is withdrawn. The liquor flows from $B^2$ into settling-tank 22 and afterward into cylinder B, in which the last traces of bicarbonate of soda are precipitated. It will be noticed that no attempt is made to get a complete absorption of the carbonic acid in $B^2$. The object is to throw down as much bicarbonate of soda as possible with an excess of carbonic-acid gas and to leave the complete absorption of the gas to an apparatus more suitable for that purpose. The gas is circulated through $B^2$ by means of a suitable fan 29, which draws carbonic acid from pipe $14^b$, forces it through cooler $B^7$, and delivers it into $B^2$ through pipe $15^a$ and returns it through a pipe $14^c$ and fan $f$ to pipe $14^a$, which conducts it to gas-cooler $B^3$ and thence through pipe 16 to carbonator B.

For the purpose of facilitating the passage of the gas through the cylinders B and B' a fan $f$, Fig. 1, is used with advantage.

The absorption vessel $B^2$ may sometimes be used by itself for the production of bicarbonate. For this purpose and also for giving it a large capacity it is of advantage to circulate the gas at great velocity in such a way that the same gas may be passed repeatedly through the apparatus. It is also of advantage for the purpose of throwing down a large quantity of bicarbonate in the vessel $B^2$ to circulate the liquor at great velocity and return the same liquor several times. In this way a most intimate contact of gas and liquor is obtained.

The circulation of gas through the vessel $B^2$ and cooler $B^7$ is obtained by means of the fan 29, aided by a proper manipulation of valves V, V', $V^2$, and $V^3$, as presently described. The circulation of liquor through the vessel $B^2$ is effected by aid of the communicating tanks 21 22, pipe 27, and pump 28, Fig. 1.

It may sometimes be desirable to pass carbonic-acid gas direct from washer 14 through pipe $14^a$ to gas-cooler $B^3$ and thence through pipe 16 into the carbonator B without carrying said gas through the cooler $B^7$ and absorption vessel $B^2$. For this purpose the valves V and V', Fig. 1, will be closed and the valve $V^2$ opened. The fan $f$ will then cause the gas to pass direct from washer 14 through pipe $14^a$ to cooler $B^3$ and thence to carbonator B. By closing valves $V^2$ $V^3$, Fig. 1, and opening the valves V V' the carbonic-acid gas will be drawn by the fan 29 from the washer 14 through pipe 14^b and forced through cooler B^7 to pipe 15^a and into the absorption vessel B^2, where the said gas will meet the brine or liquor entering said vessel through the pipe 27, after which the gas will pass off by way of the opened valve V' and the fan f and pipe 14^a to the cooler B^3 and carbonator B. By closing the valves V' and V^2 and opening the valves V V^3 a continuous circulation of gas can be maintained through the cooler B^7 and the absorption vessel B^2 by means of the fan 29 for the production of bicarbonate in the vessel B^2 so long as it is supplied with suitable liquor.

The arrangement chosen for treating the brine with carbonic-acid gas will depend greatly on the percentage of carbonic acid in the gas. In some cases it may be sufficient to pass the ammoniated brine through B' and B^2.

For the purpose of further facilitating the treatment with carbonic acid and to enable a larger production in very small apparatus I produce a carbonic-acid gas containing very little nitrogen. For this purpose I calcine limestone or other material by means of heated carbonic-acid gas. After the carbonic acid has passed through the limestone it is reheated and passed through the limestone again as often as required.

The limestone-kiln B^5 consists of a shaft with suitable arrangements for continuously charging limestone on top, consisting of a hopper 30 and a conveyer 31. The kiln is supported on columns 31^a and has a conical bottom with doors 32. Some distance from the latter are gas-ducts 33 and an annular channel 34, and at a higher level, but a considerable distance from the top, are gas off-takes 35 and an annular channel 36. The annular channel 34 is connected with the bottom of a gas-heater B^6 by means of a pipe 37. The annular channel 36 is connected to the heater B^6 by means of a pipe 38. By means of a fan 39 a continuous circulation of hot gas is kept up between the heater B^6 and the kiln B^5 in such a manner that highly-heated carbonic acid enters the kiln B^5 through the ducts 33, acts on the limestone in B^5 until the temperature of said gas is reduced, (below the temperature of reaction,) leaves through the off-takes 35, and again enters the heater through the pipe 38. The carbonic acid produced by the action of the hot gas upon the limestone passes through the fresh limestone in the upper part of the kiln B^5 and leaves in cool condition through pipe 13. As the gas thus obtained contains practically no nitrogen, (instead of from sixty to ninety per cent., as is usual in lime-kiln gas,) the absorption apparatus can be of small size, the chief point being to cool the carbonic-acid gas sufficiently to get a complete precipitation of the bicarbonate of soda. Carbonic acid is introduced into the kiln B^5, heated above the point of dissociation of $CaCO_3$. To avoid any absorption of $CO_2$, the lime is withdrawn in a hot state or a small amount of air is drawn into the furnace at the point where lime is discharged. This can be simply done by producing a small vacuum in the furnace by means of the fan. In the upper part no carbonic acid is absorbed, because there is mostly limestone present.

The settling-tanks 21, 22, 24, and 25 may with advantage be fitted with agitators g, Fig. 1, in their conical bottoms. The bicarbonate of soda is withdrawn from these vessels in form of a thick sludge and is subsequently washed in a filter or in a centrifugal apparatus.

The liquor which leaves the settling-tank 25 consists of a solution of chloride of ammonium holding some chloride of sodium. This liquor is subjected to a low temperature in cylinder C for the separation of solid chloride of ammonium. The vessel C is constructed in a similar manner to cylinders B and B', having a system of cooling-pipes in the interior through which a cooling fluid circulates. The cylinder C is further connected with a gas-cooler C', which latter consists of a cylinder containing a system of pipes 40. The space below pipes 40 is connected with one end of the cylinder C by a pipe 41, and the space above the pipes 40 communicates with the other end of C by a pipe 42. Fan 43 causes a continuous circulation of gas through C and C' in such a manner that gas cooled to very low temperature enters C through pipe 41, cools the liquor, and thus precipitates ammonium chloride during its passage through the cylinder C, and afterward reënters the cooler C' through pipe 42. The gas is cooled in the cooler C' by circulating a cooling fluid through the space surrounding pipes 40, which cooling fluid enters the cooler C' at 44 and leaves the said cooler at 45. As the liquor is brought into intimate contact with the cold gas in cylinder C the precipitation of ammonium chloride is rapid, and the apparatus has a large capacity. The liquor holding chloride in suspension leaves the cylinder C through pipe 46 and runs through settling-tank 47, which may be fitted with an agitator. The ammonium chloride is drawn into a suitable filter 48, where it is washed. The liquor flowing from settling-tank 47 consists, mostly, of a solution of sodium chloride and is returned to the washer A' after being saturated with solid sodium chloride. A pipe 5 for conducting the residual liquor to the washer A' is shown in the upper part of Fig. 1; but its connection with the settling-tank and filter 48 has been omitted from the drawings to avoid confusion. All the sodium chloride is thus utilized in the process.

The solid ammonium chloride from filter 48 may be treated with magnesium oxide or other suitable oxide for the evolution of ammonia according to the following reaction:

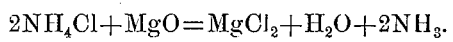
$$2NH_4Cl + MgO = MgCl_2 + H_2O + 2NH_3.$$

This reaction takes place in cylinder D, which is constructed of cast-iron in a similar manner to cylinder B. If a pipe system is used in the interior of D, it is used for heating instead of cooling. The use of such heating-pipes is not absolutely necessary with my system, and I prefer to supply all the heat for the reaction by means of a heated inert gas. The mixture of oxide of magnesium and chloride of ammonium is simultaneously heated and agitated, a rapid and complete elimination of ammonia being thereby effected. This mixture of chloride of ammonium and oxide of magnesium is produced by discharging the former continuously from hopper 49 and the latter from hopper 50. The mixture passes through the cylinder D, and a mixture of chloride and oxide of magnesium free from ammonia is discharged into hopper 51. A hot inert gas enters the cylinder D from a heater D' through a pipe 52 and leaves the said cylinder, containing much ammonia gas, through pipe 9, which leads to the absorber A. After the removal of its ammonia in the cylinder A the gas is conducted back to the heater D' by means of the pipe 10. The fan 53 effects a continuous circulation through heater D', cylinder D, and absorber A, as described. The mixture of chloride and oxide of magnesium is next heated for the production of chlorine in furnaces E and E'. These furnaces consist of iron cylinders supported and rotated in any convenient way. At each end they have stationary plates connected to the furnace by means of a stuffing-box similar to the one used on the other cylinders B, &c. The solid material enters the furnace E continuously through a conveyer $52^a$, descends from the furnace E to the furnace E' through a pipe $53^a$, and is discharged from the furnace E' into a hopper 54. The material discharged from the hopper 54 consists of practically pure magnesium oxide, which is raised to the hopper 50 by means of an elevator 55 and a conveyer 56 and is used over again in the process. The air which effects the decomposition of the magnesium chloride into chlorine and magnesium oxide enters the heater $E^2$ through pipe 57 and in passing through the said heater is brought to high temperature. The said heated air then enters the furnace E' through a pipe 58. Dilute chlorine gas leaves the furnace E' through a pipe 59 and after being reheated by passing through a heater $E^3$ enters the furnace E by means of pipe 60. From cylinder E concentrated chlorine gas is conducted through a pipe 61 to suitable absorbers (not shown) for the production of bleaching-powder. Suitable fans (not shown) can be used for the purpose of assisting the passage of the gas through the heaters $E^2$ and $E^3$ and the furnaces E and E'.

The operations described are continuous, and the apparatus is of large capacity. It gives no waste liquor or other waste material. Practically all the chlorine and alkali are recovered from the salt. No pressure-pumps are required for pumping carbonic acid. As no lime is required in the process, cement or hydrate of lime can with advantage be produced as a by-product. As no pumping of the carbonic-acid gas is required, ordinary furnace-gases can with advantage be used as a source of carbonic acid, in which case the absorption plant is made of larger size.

The apparatus described is in part applicable for similar purposes requiring the treatment of various materials with gases.

Referring to Figs. 2, 3, and 4, $b$ is the shell or outer casing of the cylinder. 2 2 are the cooling-pipes, which terminate at each end of the cylinder in plates $b'$ $b'$. The pipes 2 may be secured to the plates $b'$ $b'$ by means of flanges or by the method usually employed in locomotive-boilers. There is an annular space between each of the plates $b'$ $b'$ and the end plates $b^2$ $b^2$ of the cylinder, with which spaces the pipes 2 communicate. 3 is the cooling-fluid-inlet pipe. 4 is the cooling-fluid-outlet pipe, and $4^*$ $4^*$ are pipes respectively connecting the pipes 3 and 4 with the annular spaces between the plates $b'$ $b'$ and $b^2$ $b^2$. The cooling fluid enters by the pipe 3, passes through the pipes 2 2, and leaves by the pipe 4, as indicated by the arrows. Each of the end plates $b^2$ is provided with a flange $f$, into which fits a stationary cover $c$, provided with a rim. A suitable packing is placed between the flange $f$ and the cover $c$, which packing is held in position by an adjustable ring $r$. The liquor enters the cylinder through the pipe 19, and the liquor containing the precipitate leaves the opposite end of the cylinder by the pipe 20. The gas enters the cylinder through the pipe 18 and leaves through the pipe 7. The cover $c$ is preferably made larger at that end of the cylinder at which the outlet 20 is situated. The cylinder is rotated in any suitable manner and is supported by suitable rollers 1 1, which run on hoops or bands attached to the cylinder. The interior of the cylinder is divided into sections provided with perforated longitudinal partitions $b^3$ $b^4$ $b^5$, respectively, which may advantageously consist of wire-gauze. Between these sections are open spaces $s$, which are accessible for cleaning purposes through suitable manholes $t$. The said longitudinal partitions of each section are preferably arranged in radially-offset positions or at an angle to the longitudinal partitions of the adjacent section or sections in such manner that the longitudinal partitions $b^3$ of one section have the position shown in full line in Fig. 3, while the longitudinal partitions $b^4$ of the adjacent section have the position shown in dotted lines in Fig. 3. The longitudinal partitions $b^5$ of the next section can again have the position of the partitions $b^3$. This arrangement insures a very intimate contact of the liquor and gas in their passage through the cylinder. Vertical cross-partitions $p$ $p'$ $p^2$, respectively provided with openings $o$ $o'$ $o^2$ are arranged in such manner as to cause the gas to pass through the cylinder in a zigzag path.

For the purpose of raising the liquor and showering it on the perforated longitudinal partitions as the cylinder revolves lifters in the form of pipes $d\, d$, provided with openings $d'\, d'$, are arranged in the cylinder. The pipes $d\, d$ may be formed on or fastened to the longitudinal partition or they may be fastened to the cylinder. The said pipes may each extend throughout the cylinder, or if the cylinder is arranged in sections the pipes may also be formed in sections. The pipes $d$ are so arranged that liquor is discharged through them onto the perforated longitudinal partitions during the revolution of the cylinder.

In Fig. 5 I have shown a corrugated form of perforated partition for the cylinder, and in Fig. 6 there is shown a partition of wire-gauze, which may also be corrugated, if desired. The corrugation of these partitions will act as distributers of the liquor and prevent it from running off the partitions too quickly.

The operation of the apparatus has been already described with reference to its various parts and will be readily understood.

Although I have hereinbefore described this apparatus with reference to its operation in the manufacture of alkali products and chlorine, it will be understood that it is adapted also to various other purposes.

In some cases it is found of advantage to operate the apparatus intermittently, the liquor being treated for some time and afterward run off through suitable openings which may be arranged in the end plates of the cylinder or on the periphery.

Having described my invention, what I claim is—

1. In apparatus for manufacture of alkali products and chlorine, and for treatment of liquids with gases, the combination of a chamber A in which a solution of sodium chloride is to be saturated with ammonia, one or more carbonating-chambers B' B² B in which the ammoniated brine is to be treated with carbonic acid, a cooling-chamber C for cooling the liquor from the carbonating-chambers to separate ammonium chloride from said liquor, a chamber D for treating the solid ammonium chloride with hot gas and a suitable oxide to produce ammonia, a pipe for conducting the ammonia from said chamber D to the chamber A for saturating brine, and one or more furnaces E E' for driving off chlorine from the chlorides received from the chamber D, all the said parts of the apparatus being connected to permit a flow through the same, in one direction, of the material being treated and in intimate contact with a flow of gas in the opposite direction.

2. The combination of a chamber in which a solution of sodium chloride is saturated with ammonia, one or more carbonating-chambers in which this saturated solution is treated with cooled carbonic acid to produce bicarbonate of soda and a solution of ammonium chloride, a cooling-chamber in which solid ammonium chloride is separated from said solution, a heating-chamber in which the solid ammonium chloride is treated with hot gas and an oxide to produce ammonia and a chloride, a furnace for decomposing the said chloride to produce chlorine, the said chambers being arranged consecutively, one above another and above said furnace, means for connecting the several chambers and the furnace, for passage through the same, in one direction, of the material being treated and in intimate contact with gas flowing in the opposite direction, and means for conducting the ammonia to the chamber in which the solution of sodium chloride is saturated with ammonia.

3. The combination of a cooling and saturating chamber for cooling a solution of sodium chloride and in which the said solution is simultaneously saturated with ammonia, one or more carbonating-chambers in which this ammonia-saturated solution is treated with cooled carbonic acid to produce bicarbonate of soda and a solution of ammonium chloride, means for cooling the carbonic acid, a cooling-chamber in which solid ammonium chloride is separated from the ammonium-chloride solution, a heating-chamber in which the said solid ammonium chloride is treated with heated inert gas and an oxide to produce ammonia and a chloride, a furnace for decomposing the said chloride by heat to produce chlorine, the said chambers being arranged consecutively, one above another and above said furnace, means for connecting the several chambers and the furnace, for passage through the same, in one direction of the material being treated and in intimate contact with gas flowing in the opposite direction, and a pipe for conducting the liberated ammonia to the chamber in which the solution of sodium chloride is to be saturated with ammonia.

4. The herein-described rotary apparatus for the continuous production of alkali products and chlorine, said apparatus comprising a cooling and saturating chamber for cooling a solution of sodium chloride and simultaneously saturating the same with ammonia, carbonating-chambers for treating said solution with cooled carbonic acid to obtain bicarbonate of soda and chloride of ammonium in solution, means for repeatedly cooling the carbonic acid, a washer for washing the waste gas from the carbonating-chambers with the sodium-chloride solution to be saturated with ammonia, a cooling-chamber in which to cool the liquid flowing from the carbonating-chambers to obtain solid ammonium chloride, means for returning the residual liquor to the chamber in which the solution of sodium chloride is saturated with ammonia, a chamber for heating the solid ammonium chloride with an oxide to obtain ammonia-gas and a chloride, means for causing said ammonia-gas to circulate continuously through the solution of sodium chloride for saturating the same, and a chamber for decomposing chlorides by heated air to obtain chlorine, all the several chambers being rotatable and arranged consecutively, one above another, with connecting devices through which said chambers communicate for passage in one direction of the material being treated and in intimate contact with gas flowing in the opposite direction.

5. In apparatus for treating liquids with gases, the combination with a revolving washer, and means for conducting gas and liquor through said washer in opposite directions, of cooling-pipes extended through the washer, and means for passing a cooling medium through said pipes.

6. In apparatus for treating liquids with gases, the combination with a revolving cylinder provided with means for passing gas and liquor through said cylinder in opposite directions and in intimate contact with each other, of cooling-pipes extended longitudinally through said cylinder, perforated lifting devices arranged in said cylinder, a settling-tank connected with one end of said cylinder and provided with means for separately running off clear liquor and a sludge, and means for conducting liquid from said revolving cylinder to and through said settling-tank.

7. The combination of a series of revolving cylinders, means for conducting brine successively through said cylinders, means for conducting ammonia through an upper cylinder in a reverse direction to the flow of brine, means for conducting cooled carbonic-acid gas through the succeeding cylinders in a reverse direction to the flow of ammoniated brine, agitating devices located in the several cylinders, and cooling-pipes extended longitudinally through said cylinders.

8. The combination of a rotary cylinder, means for passing liquids through said cylinder in one direction, means for passing a gas through said cylinder in an opposite direction and in intimate contact with said liquid, cooling-pipes extended through said cylinder, and means for passing a cooling medium through said pipes in an opposite direction to the flow of liquid through the cylinder.

9. The combination with revolving cylinders, and an intermediate absorption vessel $B^2$, of means for passing liquid continuously through said cylinders and absorption vessel $B^2$, and means for passing a gaseous fluid through said absorption vessel and cylinders.

10. The combination with a revolving cylinder, and a stationary absorption vessel $B^2$ provided with means for discharging its contents, of means for passing a liquid through said cylinder and absorption vessel, and means for passing a gas through said absorption vessel in a direction opposite to the flow of liquid.

11. The combination of a revolving cylinder, means for conducting liquor and a gaseous fluid through said cylinder continuously and in reverse directions to each other, pipes extended longitudinally through said cylinder, means for passing a gaseous fluid through said pipes for changing the temperature of said cylinder, and lifting and showering devices located in the cylinder.

12. The combination of a revolving cylinder, means for passing liquid and gaseous fluid through said cylinder in reverse directions, numerous pipes extended through the interior of said cylinder, and means for conducting a gaseous fluid through said pipes.

13. The combination of a series of superposed revolving cylinders, means for conducting brine successively through the same, means for introducing ammonia into an upper cylinder, means for conducting carbonic-acid gas and ammoniated brine through the lower cylinders, and means for conducting the waste gas from the lower cylinders through the first cylinder on a higher level.

14. The combination of a revolving cylinder, means for passing liquor and gas continuously through said cylinder in reverse directions, numerous pipes extended through the interior of said cylinder, means for conducting a cooling fluid through said pipes, and devices for showering the liquor on said pipes.

15. The combination of a revolving cylinder provided at its opposite ends with inlets and outlets for the passage through said cylinder of liquor and gas in reverse directions to each other, cooling-pipes extended longitudinally through said cylinder, a settling-tank in communication with one end of said cylinder, means for continuously passing liquor from said cylinder to and through said tank, and means for withdrawing solid material in the form of sludge from said tank without interrupting the operation of treating the liquor with gas.

16. The combination with a revolving cylinder for treating ammoniated brine with carbonic-acid gas to produce bicarbonate, of a fuel-furnace, means for cooling the waste combustion-gas from said furnace, means for passing said brine and the combustion-gas in reverse directions to each other through said cylinder, and means for repeatedly cooling the combustion-gas and returning it to the brine in said cylinder.

17. The combination of a series of revolving cylinders, means for conducting brine successively through said cylinders, means for conducting waste gas through the cylinder through which the brine passes first, means for conducting ammonia-gas through the second cylinder, and means for conducting carbonic-acid gas through the last cylinder.

18. The combination with a revolving cylinder for producing bicarbonate from brine, said cylinder being provided at its opposite ends with means for passing brine and carbonic-acid gas therethrough in opposite directions and in intimate contact with each other, of a second cylinder, means for cooling the same, and means for running chloride-of-ammonium solution from the first-named cylinder to and through the second cylinder.

19. The combination of a series of superposed cylinders for treating liquor, means for passing brine continuously and successively through said cylinders, means for treating the liquor with ammonia in the first cylinder, means for treating the ammoniated liquor with carbonic-acid gas in the succeeding cylinders, means for cooling ammonium-chloride solution in the next succeeding cylinder, after separation of bicarbonate, a furnace located below the cylinders, and means for conducting ammonium chloride through the same.

20. The combination of a series of superposed cylinders, means for passing brine continuously and successively through the same, means for subjecting the brine in the several cylinders successively to the action of ammonia, carbonic-acid gas and a cooling medium, several superposed furnaces located below said cylinders, means for passing ammonium chloride mixed with oxide through an upper one of said furnaces, and means for conducting the mixture thus obtained through a lower one of said furnaces in the presence of air.

21. The combination of a revolving cylinder, means for passing a liquor and a gas through said cylinder in reverse directions, and corrugated and perforated partitions arranged in said cylinder and alternately immersed in the liquor and exposed to the gas contained in said cylinder.

22. The combination of a revolving cylinder, means for passing a liquid and a gas through said cylinder in reverse directions, and wire-gauze partitions arranged in said cylinder and alternately immersed in the liquid and exposed to the gas contained in said cylinder.

23. The combination with a revolving cylinder and corrugated wire-gauze partitions located in said cylinder, of means for passing a liquid and gas through said cylinder in reverse directions.

24. The combination with a revolving cylinder divided into sections, of radially and longitudinally arranged partitions located in said cylinder, the partitions in each section being radially offset from the partitions in adjacent sections.

25. The combination with a revolving cylinder divided into sections, of longitudinal partitions arranged in the several sections, and vertical cross-partitions between said sections and provided with openings.

26. The combination of a revolving cylinder having at each end an end plate provided with an annular flange, a stationary cover fitted into said flange and provided with inlet and outlet pipes, a system of pipes extended through the cylinder and connected with said inlet and outlet pipes, and other pipes for admitting a fluid and a gas into said cylinder to flow therethrough in opposite directions.

27. The combination with a revolving cylinder having end plates provided with annular flanges, of stationary covers fitted to said annular flanges and provided with inlets and outlets for the passage of liquor and gas in opposite directions through said cylinder, adjustable packing devices between said covers and flanges, and means for cooling the contents of said cylinder.

28. The combination with a rotary cylinder provided with inlets and outlets for the flow of liquor and gas through said cylinder in opposite directions, of a system of pipes extended through the cylinder for the passage of a gaseous fluid, and lifters arranged in said cylinder for showering liquor onto said pipes.

29. The combination with a revolving cylinder having a hollow ring in each end, of a system of non-perforated pipes communicating with each ring and extending through the cylinder, and centrally-located inlet and outlet pipes in communication with said hollow rings at the ends of the cylinder.

30. The combination with a revolving cylinder, of a number of non-perforated pipes extended longitudinally through said cylinder, an annular pipe at each end of said cylinder and in communication with said non-perforated pipes, a centrally-located pipe in communication with each of said annular pipes, agitating devices in said cylinder, and means for conducting liquor and a gas through said cylinder in opposite directions and in intimate contact with each other.

31. The combination with a revolving cylinder having its opposite ends provided with inlets and outlets for the admission of liquor and a gas to flow through said cylinder in opposite directions and in intimate contact with each other, of non-perforated cooling-pipes extended through said cylinder, and perforated pipes fixed in said cylinder and having their perforations so arranged that liquor will be showered through the cylinder during its whole revolution.

32. The combination with a rotary cylinder, of cooling-pipes extended through said cylinder for the passage of a cooling fluid, said cylinder being provided with inlets for the admission and outlets for the exit from said cylinder of liquid and gas, and perforated pipes arranged longitudinally in said cylinder for lifting and distributing the liquid as the cylinder revolves.

33. The combination of a rotary cylinder having its opposite ends provided with means for the admission to and exit from said cylinder of liquid and gas to flow through said cylinder in opposite directions and in intimate contact with each other, perforated and longitudinally-extended partitions radially arranged in said cylinder, and perforated lifting-pipes for lifting and showering the liquid on said partitions during the whole revolution of the said cylinder.

34. The combination with a rotary cylinder having means for the admission to and exit from said cylinder of liquid and gas to flow through the cylinder in opposite directions, of cooling-pipes in said cylinder through which pipes a cooling fluid flows, longitudinal radially-arranged perforated partitions in said cylinder, and perforated pipes for lifting and showering the liquid on said partitions during the whole revolution of the cylinder.

35. The combination with a revolving cylinder having its opposite ends provided with inlets and outlets for passing liquor and gas through said cylinder in opposite directions, of perforated cross-partitions in said cylinder, and perforated radial and longitudinally-extended partitions for lifting and showering liquor during the whole revolution of the cylinder.

36. The combination with a rotary cylinder provided with means for passing liquid and gas to flow through said cylinder in opposite directions, of cooling-pipes in said cylinder, through which pipes the cooling fluid flows, perforated longitudinal radially-arranged partitions in said cylinder, vertical cross-partitions provided with openings, and means for lifting and showering liquid on the partitions in said cylinder during the whole of its revolution.

37. The combination with a revolving cylinder provided with means for passing liquor and gas through said cylinder in opposite directions, of radially-arranged and perforated partitions extended longitudinally in said cylinder, and vertical cross-partitions located in said cylinder and provided with holes so arranged as to cause the liquor and gas to pass through said cylinder in zigzag paths.

38. The combination with a rotary cylinder provided with means for passing liquid and gas through said cylinder in opposite directions, of longitudinal radially-arranged partitions arranged in sections in said cylinder, the radial partitions in each of said sections being arranged at an angle to the radial partitions in the adjacent sections.

39. The combination with a rotary cylinder provided at its opposite ends with means for the admission and exit of liquor and gas to flow through said cylinder in opposite directions and in intimate contact with each other, of longitudinally and radially arranged partitions located in said cylinder in separate sections, with spaces between adjacent sections, and perforated cross-partitions at the ends of the several sections.

40. The combination with a rotary cylinder provided with means for passing liquid and gas through said cylinder in opposite directions, of cooling-pipes in said cylinder, through which pipes the cooling fluid flows, perforated longitudinal radially-arranged partitions in said cylinder, which radial partitions are arranged in sections with spaces between adjacent sections, the radial partitions in each of which sections being arranged at an angle to the radial partitions of adjacent sections, vertical cross-partitions provided with holes to direct the path of the gas through the cylinder, and perforated pipes for lifting and showering the liquid onto said partitions as the cylinder revolves.

In testimony whereof I have hereunto set my hand in presence of two subscribing witnesses.

PAUL NAEF.

Witnesses:
C. E. LANGDON,
GERRIT SMITH.